UNITED STATES PATENT OFFICE.

FREDERICK GREENING, OF BEAUFOY ROAD, PLAISTOW, ENGLAND.

IMPROVEMENT IN THE MANUFACTURE OF SOLUBLE GUN-COTTON AND PRODUCTS THEREFROM.

Specification forming part of Letters Patent No. 172,995, dated February 1, 1876; application filed December 23, 1875.

*To all whom it may concern:*

Be it known that I, FREDERICK GREENING, of Beaufoy Road, Plaistow, in the county of Essex, England, have invented Improvements in the Production and Use of Soluble Gun-Cotton or compounds analogous thereto, of which the following is a specification:

This invention relates to the production of so-called soluble gun-cotton or of compounds analogous thereto; and consists, first, in the employment, for effecting the conversion of cotton or of other ligneous fibers, of hydrochloric acid, in addition to and in conjunction with the sulphuric acid and nitric acid now generally employed; and, secondly, in the treatment of soluble gun-cotton or of products analogous thereto, obtained as before mentioned, or otherwise, after having been freed, by washing in water, from the excess of acids contained therein by submitting the same to the action of an alkaline bath, in order that any acid or acids remaining in the converted cotton or product may be neutralized, and a purer or comparatively purer product may be obtained; thirdly, the employment, in conjunction with soluble gun-cotton, or of compounds analogous thereto, for the production of ornamental objects or for other purposes, such, for example, as the production of transparent or of semi-transparent materials or compounds in lieu of the opaque materials hitherto employed in the production of compounds produced from the so-called soluble gun-cotton, such insoluble materials being, by preference, silica, powdered glass, or sulphate of lime, or other semi-opaque or semi-transparent substances.

In carrying out my invention I cause the cotton or ligneous fibers or other ligneous materials to be submitted to the action of a mixture of the acids before mentioned, viz., hydrochloric and sulphuric and nitric acids, and I prefer to effect the conversion of the cotton or ligneous fibers or materials at a temperature not exceeding 100° Fahrenheit. After having effected such conversion I wash the product obtained with water, and then remove and neutralize the last remaining traces of acid or acids by submitting the product to an alkali or to an alkaline bath, and then to a subsequent washing. The product thus resulting I dissolve in any of the well-known solvents, or act upon it the same, so as to convert it into a plastic condition, by means of any of the well-known solvents of soluble gun-cotton, and I either employ the same in such condition, or I mix it with the transparent or with the semi-transparent or diaphanicous compounds before referred to.

In carrying out this first part of my invention I take about one pound of cotton or of other ligneous fibers or materials, and I submit the same to the action of a mixture of sulphuric, hydrochloric, and nitric acids in about the following proportions, viz: Sulphuric acid, of about 1.850° specific gravity, about, by measure, two hundred and fifty parts; hydrochloric acid of the specific gravity of 1.170°, about, by measure, thirty-five parts; nitric acid, of about the specific gravity of 1.420°, about, by measure, fifty parts; and I prefer that the temperature during conversion should not be allowed to exceed 100° Fahrenheit.

Although I have given the strengths or densities and proportions of the acids hereinbefore mentioned, these proportions may vary, and acids of greater or of less strength or density may be employed, my object being to effect as perfectly as possible the conversion of cotton or of ligneous fiber or materials into soluble gun-cotton.

The cotton or ligneous fiber or materials having been converted into what is known as soluble gun-cotton is then removed from the acid-bath, and the excess of acid is separated either by pressure or by means of a centrifugal machine, as is well understood. The product thus resulting will contain a certain amount of acid, and in order to rid or free the product from such acid or acids the product is washed first in water, and is then submitted to the action of an alkali or of an alkaline bath, and finally to successive washings in water, in order that all traces of the residual acid may be removed. The soluble gun-cotton thus obtained is then submitted to a desiccating process, and when desiccated is dissolved by the employment of any of the well-known solvents of soluble gun-cotton, and in such condition may be employed for all purposes for which dissolved soluble gun-cotton is now used or applied.

In order to produce molded or other forms for ornamental or other purposes the soluble gun-cotton, obtained either as before mentioned or otherwise, is converted into a plastic mass by means of any of the well-known solvents, and when in such condition is incorporated with any one or more of the materials hereinbefore referred to, viz., silica, powdered glass, or other similar materials, and when thoroughly incorporated may be molded or converted into any desired form or shape.

It will be readily understood that coloring or other matters may be incorporated with the improved soluble gun-cotton in a manner similar to that now adopted when the ordinary soluble gun-cotton is employed, and the product resulting may be employed for similar purposes.

Another part of this invention relates to the manufacture and use of compounds capable of being employed for effecting the insulation of telegraph-wires, or for other purposes, and consists in submitting mixtures of paraffine, shellac, resin, or gum—such, for example, as copal—either alone or in combination, and also of the residues left after effecting the distillation of the heavier oils of tar—by preference those obtained from wood tar, or mixtures of any two or more of the before-mentioned substances with soluble gun-cotton, or with soluble compounds analogous thereto—to the action of creosote obtained from wood-tar, or of those products of distillation containing the same. These I employ, together with other solvents of soluble gun-cotton, which, at an elevated temperature, effects the combination or incorporation of the materials before referred to, and thus converts them into a uniform plastic condition, in which condition the mass may be employed for purposes where pliability is required, or which may be employed to cover wire or wires for telegraphic or other purposes.

The compound or compounds thus obtained may be employed as a substitute for, and in a manner similar to, that now adopted for the employment of india-rubber in and for the production of water-proof fabrics, or for other purposes, and also in the production of goods or of coated fabrics or materials, such coated fabrics or materials being capable of being employed for book-binding, or as a substitute for leather, or for leather-cloth, or other similar purposes.

It will be evident that creosote obtained from wood-tar, being a solvent of soluble gun-cotton and of paraffine, and also of the gums and other substances before mentioned, it may be employed in conjunction with any of the solvents of the same.

I claim—

1. The method of converting cotton or other ligneous fibrous materials into what is known as soluble gun-cotton by the employment of mixtures of sulphuric acid, of hydrochloric acid, and of nitric acid, in the manner and for the purposes hereinbefore mentioned.

2. The mode of obtaining semi-transparent products from soluble gun-cotton by the employment, in conjunction with soluble gun-cotton, either prepared as before mentioned or otherwise, of materials such, for example, as finely divided and levigated silica, obtained either by the calcination of flints, or of silica in other forms, or of powdered glass, or of sulphate of lime, or mixtures of the same.

3. The process of obtaining products for insulating and other purposes by the employment, substantially as set forth, of creosote obtained from the distillation of wood-tar with soluble gun-cotton and the several gums and substances hereinbefore mentioned.

In witness whereof I have signed my name to this specification in the presence of two subscribing witnesses.

FREDERICK GREENING.

Witnesses:
CHAS. MILLS,
 47 *Lincoln's Inn Fields, London.*
ARTHUR PEARCEY,
 47 *Lincoln's Inn Fields, London.*